May 16, 1967 W. F. MILLER 3,320,551
TEMPERATURE STABILIZED MULTIVIBRATOR
Filed April 12, 1965

INVENTOR.
WAYNE F. MILLER
BY HIS ATTORNEYS
HARRIS, KIECH, RUSSELL & KERN 3,320,551

TEMPERATURE STABILIZED MULTIVIBRATOR

Wayne F. Miller, Arcadia, Calif., assignor to California Institute Research Foundation, Pasadena, Calif., a corporation of California Filed Apr. 12, 1965, Ser. No. 447,127
9 Claims. (Cl. 331—113)

This invention relates to multivibrators and, in particular, to highly stable multivibrators with the period or frequency substantially independent of temperature.

It is an object of the invention to provide a new and improved temperature compensating circuit for multivibrators. A further object is to provide such a circuit which may be used with monostable or one-shot multivibrators and with astable or free-running multivibrators.

It is an object of the invention to provide temperature compensation circuitry which is operable throughout the operating range of the multivibrator transistors, such as in the range of 20° C. to 120° C. and greater.

It is a particular object of the invention to provide temperature compensating circuitry for multivibrators utilizing solid state components and using the same type components for the multivibrator and for the temperature compensation circuitry. A further object is to provide such a circuit which is particularly adapted for manufacture in the form of a monolithic silicon microcircuit.

It is an object of the invention to provide a multivibrator incorporating a clamping voltage with the magnitude of the clamping voltage being varied as a function of temperature to compensate for temperature variations in the multivibrator transistor characteristics. A further object is to provide a temperature compensated multivibrator circuit wherein the period is independent of power supply variations.

It is an object of the invention to provide a temperature compensated multivibrator incorporating a voltage clamping diode connected between a multivibrator transistor collector and a clamp voltage source, with the potential of the source varying as a positive function of temperature. A further object of the invention is to provide a temperature compensating circuit including a series circuit connected across a voltage supply and including at least one forward biased diode and a resistance connected in series providing a clamp voltage at the junction of the diode and resistance. An additional object is to provide such a circuit in which the amount of temperature compensation can be selected by utilizing one or more of the forward biased diodes in series.

The invention also comprises novel combinations and arrangements of components, which will more fully appear in the course of the following description. The drawing merely shows and the description merely describes preferred embodiments of the present invention which are given by way of illustration or example.

Figure 1:
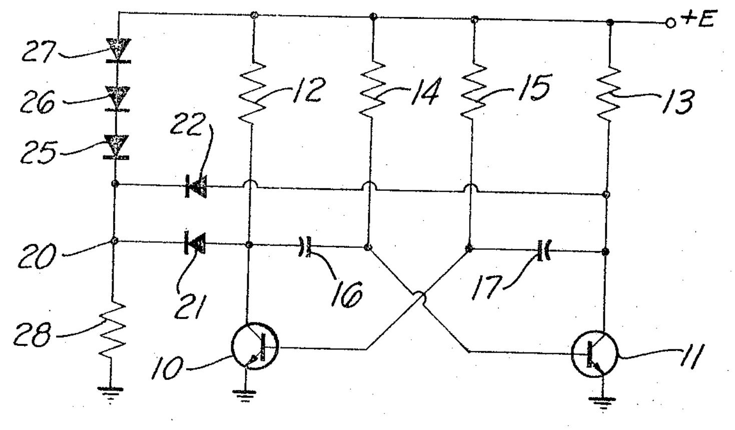
FIG. 1 is a schematic diagram illustrating a free-running multivibrator incorporating a preferred embodiment of the invention.

The multivibrator circuit of FIG. 1 is a typical free-running multivibrator and includes transistors 10, 11, load resistors 12, 13, timing resistors 14, 15, and timing capacitors 16, 17. These components form a circuit which will function as a conventional free-running multivibrator. The period or frequency of this multivibrator will be affected by temperature, particularly due to changes in characteristics of the transistors.

In the temperature compensation circuitry of the invention, the collector of the transistor 10 is connected to a junction point 20 by a diode 21 and the collector of the transistor 11 is connected to the same junction point 20 by another diode 22. The diodes 21, 22 function as voltage clamps, holding the respective collectors at or above the clamp voltage of the junction 20. The temperature coefficient of the clamp voltage provided at the junction 20 is made positive to compensate for the negative temperature coefficient of the transistors 10, 11 and the clamp diodes 21, 22.

The clamp voltage preferably is produced by means of a series circuit connected across a multivibrator power supply and including at least one and preferably three diodes 25, 26, 27 connected in series with a resistor 28, providing the clamp voltage at the junction 20 between the diodes and the resistor. The diodes 25, 26, 27 are operated in the forward biased condition and preferably are base-emitter diodes of the same type transistor as the transistors 10, 11. The clamp diodes 21, 22 also preferably are base-emitter diodes of transistors of the same type as the transistors 10, 11.

Figure 3:
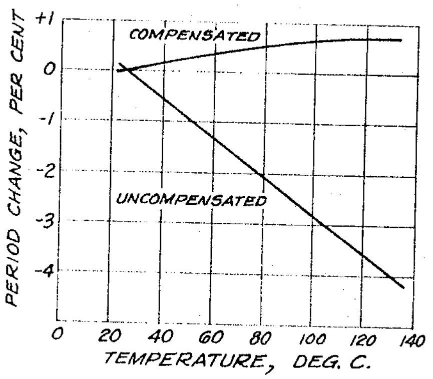
FIG. 3 is a graph comparing the performance of the circuit of FIG. 1 with a conventional circuit; and FIGS. *4a–4e* illustrate various connections which can be employed to have a transistor function as a diode.
Figure 4A:
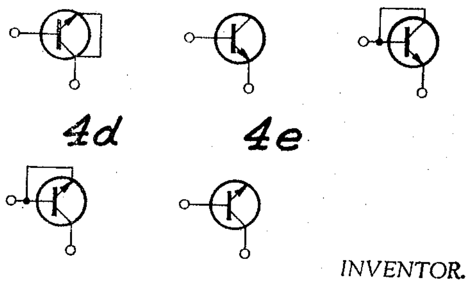

The performance of the multivibrator of FIG. 1 with and without the temperature compensation circuitry is set out in the graph of FIG. 3. In the particular circuit reported in the test results, both transistors and all five diodes were type 2N2331 silicon planar transistors, the load resistors 12, 13 were 3900 ohms, the timing resistors 14, 15 were 22,100 ohms, the resistor 28 was 2000 ohms, and the capacitors 16, 17 were .01 microfarads. The supply voltage was 6 volts and the operating frequency was about 3000 cycles per second. The resistors and capacitors had temperature coefficients less than 0.001% per degree C. The transistors were standard production items with no preselection. From the graph of FIG. 3, it is seen that the uncompensated circuit had a period change of about 4% with a temperature change of about 100° C. while the compensated circuit had a period change of less than 1% for the same temperature range.

While in the preferred circuit, three diodes 25, 26, 27 are used in series, it should be noted that the amount of compensation is a function of the number of diodes utilized and that one, two or more than three may be utilized to obtain different characteristics. The circuit of FIG. 1 utilizes npn transistors, but of course, the invention is equally applicable to the use of pnp transistors with the polarities of the diodes reversed.

The diodes 21, 22, 25–27 may be conventional two-element semiconductor diodes, but preferably are transistors operated as diodes. Typical circuit connections for the use of transistors are shown in FIGS. *4a–4e*. The temperature coefficient varies somewhat with the various connections providing a range to select from to more closely match the temperature coefficients of the transistors. The multivibrator with temperature stabilization circuitry is well suited for production in the form of a monolithic silicon microcircuit, particuarly with identical semiconductor components for the multivibrator transistors and the stabilization diodes.

With the temperature compensating circuitry of the invention, the period of the multivibrator is substantially independent of power supply variations. The desired temperature stability is obtained without requiring resistors and capacitors having specific temperature coefficients and without selection and/or adjustment of component values.

Figure 2:
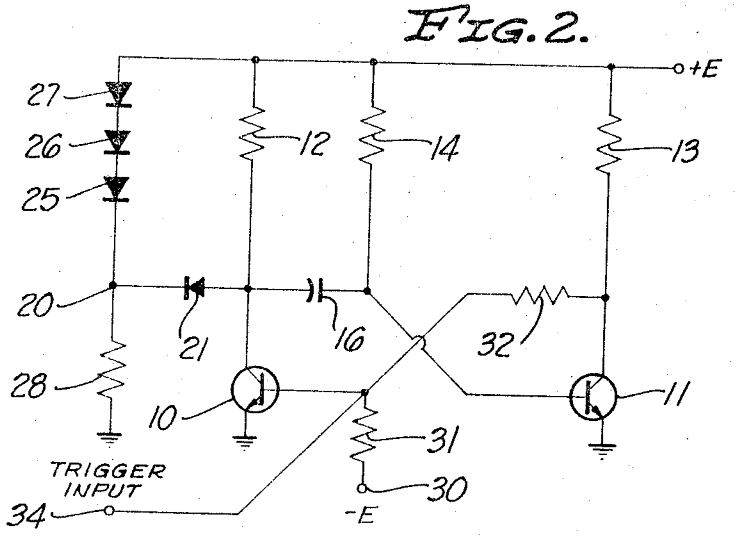
FIG. 2 is a schematic diagram illustrating a monostable multivibrator incorporating the preferred embodiment of the invention.

FIG. 2 illustrates a typical monostable or one-shot multivibrator incorporating the temperature compensation circuitry of the invention. Components in the circuit of FIG. 2 identical to those of the FIG. 1 are identified by the same reference numerals. A bias voltage is applied at a terminal 30 which is connected to the base of the transistor 10 through a resistor 31, with the base connected to the collector of the transistor 11 via another resistor 32. The input trigger pulse is applied at a terminal 34. The operation of the compensation circuitry in the multivibrator of FIG. 2 is the same as in the multivibrator of FIG. 1. The collector of the transistor 11 need not be clamped in the monostable circuit.

The multivibrator of the invention may be used in any of the situations wherein conventional multivibrators are employed, including use as very stable voltage controlled oscillators.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In a transistor multivibrator, a temperature compensating circuit comprising a voltage clamp diode connected between a multivibrator transistor collector and a clamp voltage source comprising a passive circuit with the voltage varying as a positive function of temperature.

2. In a transistor multivibrator, a temperature compensating circuit comprising:

a passive series circuit connected across a voltage source and including at least one forward biased diode and a resistance connected in series providing a clamp voltage at the junction of the diode and resistance; and a voltage clamp diode connected between a multivibrator transistor collector and said clamp voltage junction.

3. In a transistor multivibrator, a temperature compensating circuit comprising:

a series circuit connected across a voltage source and including three forward biased diodes and a resistance connected in series providing a clamp voltage at the resistance-diode junction; and a voltage clamp diode connected between a multivibrator transistor collector and said clamp voltage junction.

4. In a transistor multivibrator, a temperature compensating circuit comprising:

a series circuit connected across a voltage source and including at least one forward biased diode and a resistance connected in series providing a clamp voltage at the junction of the diode and resistance; and a voltage clamp diode connected between a multivibrator transistor collector and said clamp voltage junction;

with all of said diodes being transistors of the same type as the multivibrator transistors and operated as diodes.

5. In a transistor multivibrator, a temperature compensating clamping circuit comprising a passive series circuit connected between a voltage source and circuit ground and including at least one forward biased diode and a resistance, with another forward biased diode connected between the resistance-diode junction and the point in said multivibrator being clamped.

6. In a temperature compensated multivibrator, the combination of:

a first transistor and a first load resistance connected in series at a first junction and across a voltage source;

a second transistor and a second load resistance connected in series at a second junction and across said voltage source;

first circuit means for coupling a trigger pulse to the base of said first transistor;

second circuit means for coupling a trigger pulse to the base of said second transistor;

a first clamp diode connected between said first junction and a clamp voltage; and at least one forward biased diode and a third resistance connected in series at a third junction and across said voltage source providing said clamp voltage at said third junction.

7. In a temperature compensated free-running multivibrator, the combination of:

a first transistor and a first load resistance connected in series at a first junction and across a voltage source;

a second transistor and a second load resistance connected in series at a second junction and across a voltage source;

a first resistance-capacitance series circuit connected across said first resistance with the capacitance connected to said first junction and with the resistance-capacitance junction connected to the base of said second transistor;

a second resistance-capacitance series circuit connected across said second resistance with the capacitance connected to said second junction and with the resistance-capacitance junction connected to the base of said first transistor;

a first clamp diode connected between said first junction and a clamp voltage;

a second clamp diode connected between said second junction and said clamp voltage; and at least one forward biased diode and a third resistance connected in series at a third junction and across said voltage source providing said clamp voltage at said third junction.

8. In a temperature compensated monostable multivibrator, the combination of:

a first transistor and a first load resistance connected in series at a first junction and across a voltage source;

a second transistor and a second load resistance connected in series at a second junction and across a voltage source;

a resistance-capacitance series circuit connected across said first resistance with the capacitance connected to said first junction and with the resistance-capacitance junction connected to the base of said second transistor;

a trigger input circuit comprising a resistance connected between said second junction and the base of said first transistor with an input terminal coupled to said base;

a first clamp diode connected between said first junction and a clamp voltage; and at least one forward biased diode and a third resistance connected in series at a third junction and across said voltage source providing said clamp voltage at said third junction.

9. In a temperature compensated multivibrator, the combination of:

a first transistor and a first load resistance connected in series at a first junction and across a voltage source;

a second transistor and a second load resistance connected in series at a second junction and across said voltage source;

first circuit means for coupling a trigger pulse to the base of said first transistor;

second circuit means for connecting a trigger pulse to the base of said second transistor;

a first clamp diode connected between said first junction and a clamp voltage; and three additional forward biased diodes and a third resistance connected in series across said voltage source, providing said clamp voltage at the resistance-diode junction;

with said first clamp diode and said three additional forward biased diodes being transistors of the same type as said first and second transistors and operated as diodes.

References Cited by the Examiner

UNITED STATES PATENTS

| | | | |
|---|---|---|---|
| 3,239,778 | 3/1966 | Rywak | 331—113 |
| 3,253,237 | 5/1966 | Runyan | 331—113 X |

ROY LAKE, *Primary Examiner.*

S. H. GRIMM, *Assistant Examiner.*